SERVO-TYPE MEASURING APPARATUS INCLUDING MODULATOR AND ANTI-HUNT MEANS MATCHED TO THE INPUT OF THE SERVO-AMPLIFIER

Filed Feb. 24, 1964 2 Sheets-Sheet 1

3,354,391
Patented Nov. 21, 1967

3,354,391

SERVO-TYPE MEASURING APPARATUS INCLUDING MODULATOR AND ANTI-HUNT MEANS MATCHED TO THE INPUT OF THE SERVO-AMPLIFIER

James F. Payne, Jr., Abington, Pa., assignor to Leeds & Northrup, a corporation of Pennsylvania Filed Feb. 24, 1964, Ser. No. 346,914
3 Claims. (Cl. 324—99)

This invention relates to self-rebalancing electromechanical systems and particularly relates to systems in which a DC signal of unknown magnitude representative of a process variable is balanced by an opposing reference DC voltage derived from a motor-operated potentiometer slidewire.

In accordance with the present invention, the two opposing DC voltages are applied to a summing point which is capacitively coupled to the input circuit of an amplifier having an input terminal common to the DC voltage sources. The reference voltage is modulated, preferably by a solid-state chopper network, at the continuous excitation frequency of a winding of the slidewire motor. For efficient conversion of any unbalance between the opposing DC voltages to an AC error signal, the connection from the summing point to the unknown DC signal includes a conductive impedance of magnitude of the same, or higher, order of magnitude as the input impedance of the amplifier.

Additionally in accordance with the present invention, the AC signal path including the modulator and the input impedance of the amplifier includes an RC network effective to introduce in the AC input signal of the amplifier a damping component proportional to the speed of adjustment or velocity of the slidewire. For amplifiers having suitably high input impedance, the coupling capacitor from the summing point and the input impedance of the amplifier provide such network: for amplifiers having substantially lower impedance, an additional network, comprising a resistance and capacitance in shunt thereto, is connected in series between the modulator and either the summing point or the slidewire contact.

Further in accordance with the invention, the connection from the source of unknown DC voltage to the summing point may include a filter network whose parameters are selected or adjusted both to attenuate AC pickup superposed on said voltage and to optimize the aforesaid damping component of the AC error signal applied to the amplifier.

The invention further resides in a system having new and useful features of combination and arrangement hereinafter described and claimed.

Figure 1:
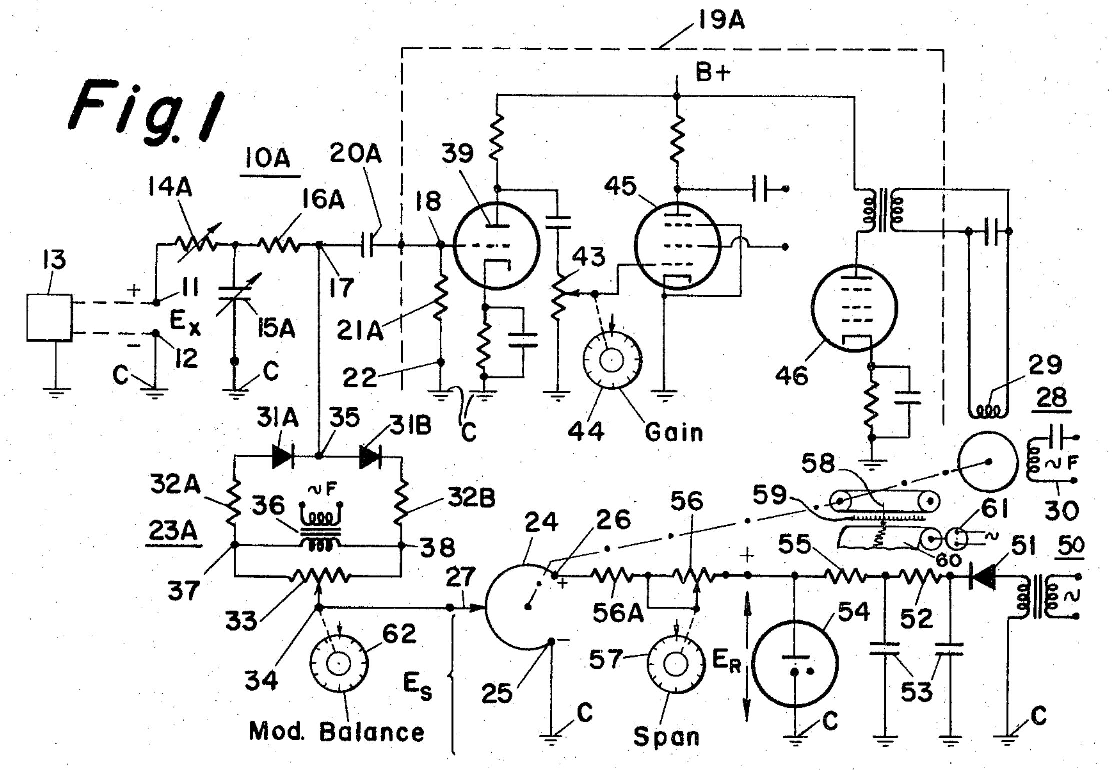
Figure 2:
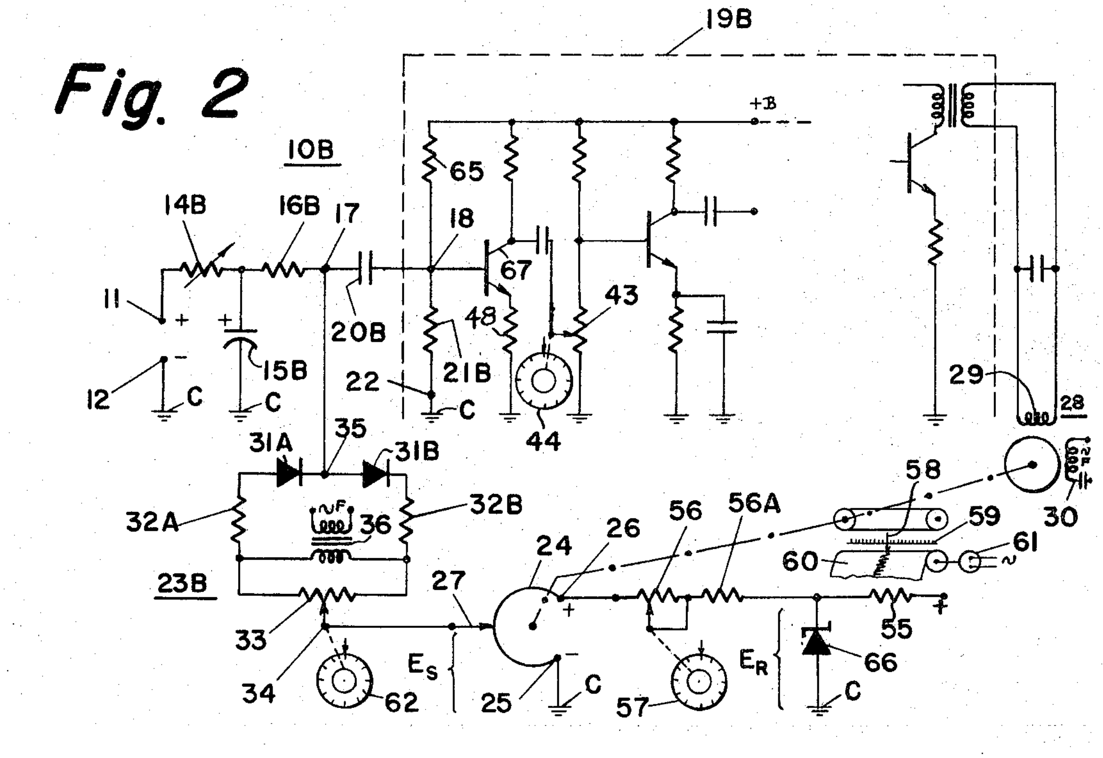
Figure 3:
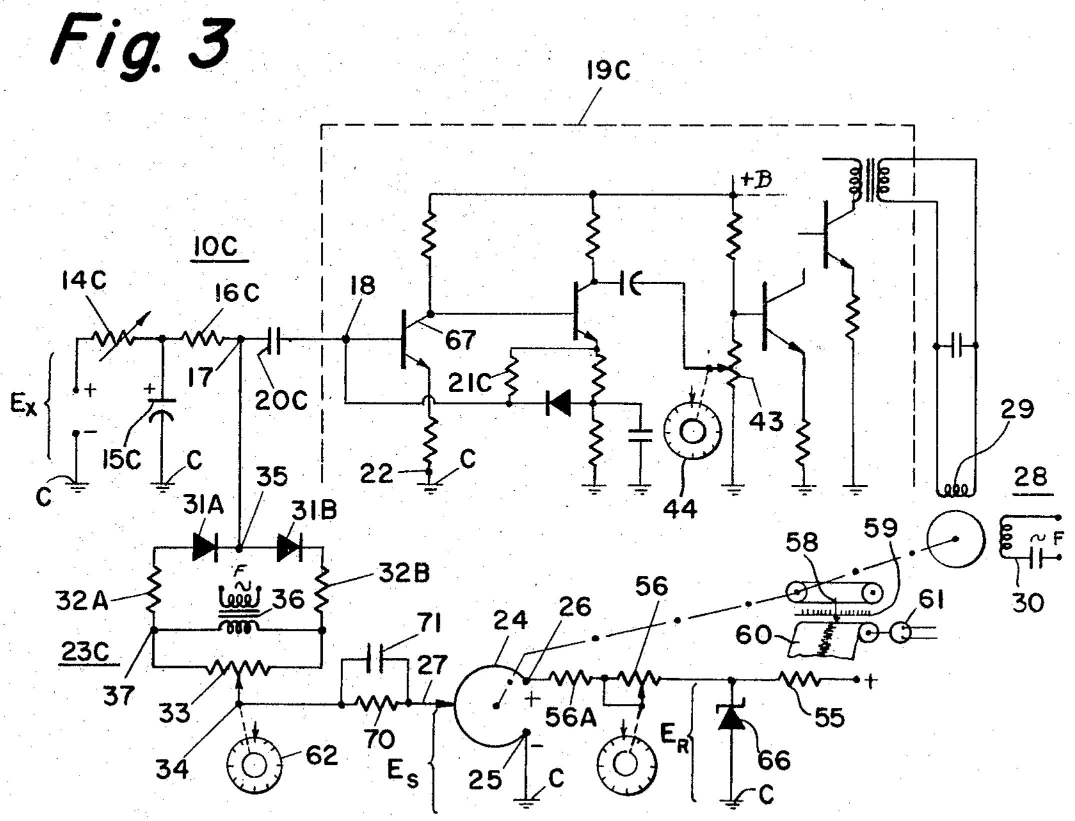
Figure 4:
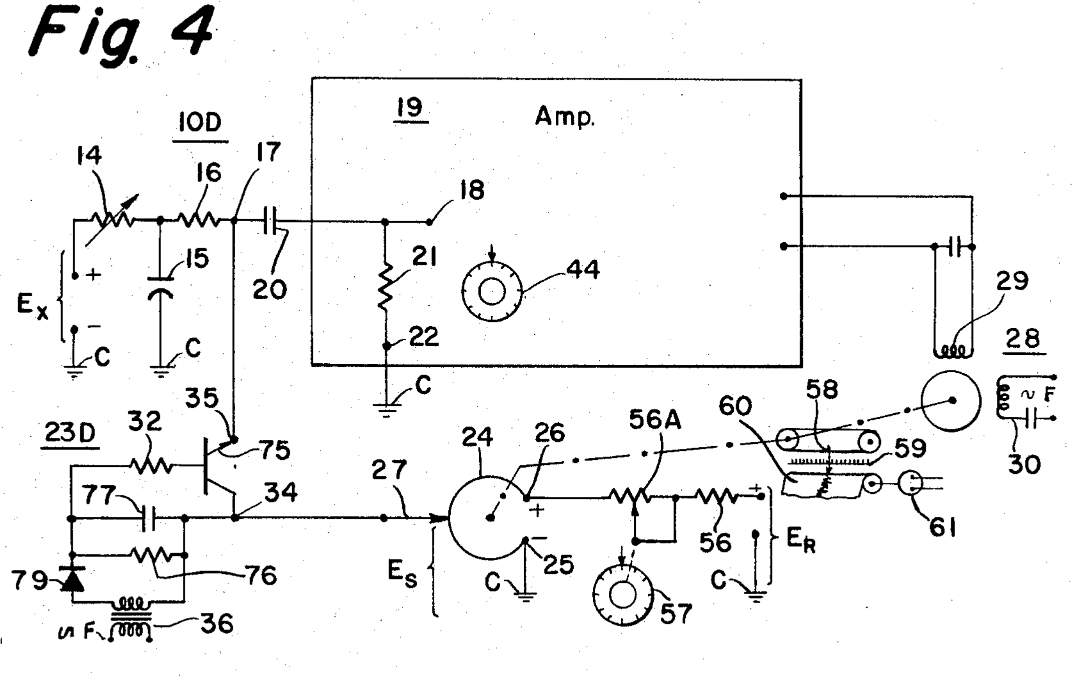

For a more detailed understanding of the invention, reference is made to the following description and to the accompanying drawings in which:

FIG. 1 discloses a self-rebalancing system including a diode-modulator network and a multi-stage vacuum tube amplifier;

FIG. 2 discloses a self-rebalancing system including a diode-modulator network and a multi-stage transistor amplifier of high input-impedance type;

FIG. 3 discloses a self-rebalancing system including a diode-modulator network and a multi-stage transistor amplifier of low input-impedance type; and FIG. 4 discloses a self-balancing system similar to any of FIGS. 1 to 3 but using a transistor-modulator network.

The self-balancing measuring system 10A shown in FIG. 1 is provided with a pair of signal input terminals 11 and 12 for connection to a source 13 of unknown unidirectional voltage $E_X$. The source 13 may be, and usually is, a transducer, or a transducer-amplifier, responsive to the variations in magnitude of a condition, such as pressure, temperature, electrical generation or other process variable to be measured for indicating, recording or control purposes. The signal input terminal 12 has a "common" connection C to the input terminal 22 of a multi-stage tube amplifier 19A and to terminal 25 of a potentiometer circuit including slidewire 24. The other signal input terminal 11 is continuously connected, via the high impedance or resistance means 14A, 16A, to a summing point 17 which is coupled by the blocking capacitor 20A to the other amplifier input terminal 18. In most installations, the leads to the remote transducer 13, and/or the transducer itself, undesirably pick up a power-line frequency signal which is superposed on the DC signal $E_X$. To minimize or eliminate such undesired AC component at the summing point 17, a capacitor 15A is connected between the aforesaid common connection and the junction of resistors 14A, 16A so to form a filter network.

The adjustable DC voltage $E_S$ derived from slidewire 24 is periodically applied to the summing point 17 via the modulator or chopper 23A in opposition to the unknown voltage $E_X$. The slidewire current is supplied from any suitable source of constant or regulated voltage $E_R$. Resistance means, including fixed resistance 56A and rheostat 56 connected between the upper terminal 26 of slidewire 24 and the positive pole of the $E_R$ source, provides for setting of the slidewire current to a predetermined magnitude. Spceifically, the rheostat dial or scale 57 may be calibrated in terms of selected ranges through which the balacing or reference voltage $E_S$ may be varied by adjustment of slidewire 24 relative to its contact 27. For measuring ranges starting at a value above zero, an end coil (not shown) is connected between the common connection C and the lower terminal 25 of the slidewire 24.

The DC power source for supplying the constant voltage $E_R$ may, as shown in FIG. 1, comprise a transformer 50 whose primary is connected to an AC power line and whose secondary is connected through rectifier 51 and to a filter network including resistor 52 and capacitors 53. The DC output of such filter is applied to the regulating circuit including resistor 55 and the voltage regulator tube 54. The same DC power source may be used for the tubes of amplifier 19A.

In the form shown in FIG. 1, the modulator 23A connected between the slidewire contact 27 and the summing point 17 comprises a pair of diodes 31A, 31B poled for half-wave rectification of the switching frequency F applied to the AC input terminals 37, 38 of the modulator network. Specifically, the AC input of the modulator may be supplied by an isolating step-down transformer 36 having its primary connected, for example, to a 60-cycle, 120-volt power line. The swamping resistors 32A, 32B are respectively connected between the AC input terminals 37, 38 and a corresponding one of the diodes 31A, 31B. The common terminal 35 of the diodes is connected to the summing point in the input system of amplifier 19A. The contact 27 of the measuring slidewire 24 is connected to the adjustable contact 34 of a voltage-divider resistor 33 connected between the AC input terminals 37, 38 of the modulator.

Preliminary to normal use of the system, and with the DC voltages $E_S$, $E_X$ either zero or in balance, the contact 34 is manually set as by dial 62 so that the modulator bridge 23A is in balance, i.e., so that there is no AC voltage difference between the output terminals 34, 35 of the modulator. Such balance of the modulator at the modulation-frequency F may be checked from time to time after the system has been put into use in a given installation.

With the system 10A in use, and with the opposed voltages $E_X$ and $E_S$ in balance under steady-state conditions, the voltage at the summing point 17 is an unmodulated DC voltage equal in magnitude to each of the voltages $E_X$, $E_S$. Under this circumstance, there exists no error signal for application to the input terminal 18 of amplifier 19A, via the capacitor 20A from the summing point 17. Upon subsequent occurrence of an increase or decrease in magnitude of the unknown DC voltage $E_X$, the DC potential at terminal 35 of the modulator network 23A correspondingly rises above or falls below the DC potential at terminal 34 of that network. In consequence of the resulting modulator action, there initially occurs at the summing point 17 a pulsating error signal equal in magnitude to the difference between the voltages $E_X$, $E_S$ and whose frequency F is that of the AC input to the modulator 23A. The phase of this AC error signal depends upon the sense of unbalance between the DC voltages $E_X$, $E_S$.

This AC error signal is passed by the coupling capacitor 20A to the input terminal of the multi-stage amplifier 19A which may be of known type having RC networks for interstage coupling between its vacuum tubes. The amplified error signal produced in the final stage of the amplifier is utilized to excite the reversible motor 28 which is mechanically coupled to the measuring slidewire 24. Specifically, the motor 28 may be a two-phase induction motor having one field winding 29 energized by the amplifier output and another winding 30 continuously energized from the same AC source as the modulator 23A.

The motor 28 and modulator 23A are so phased that the adjustment of slidewire 24 by motor 28 in response to an initial error signal is in sense to reduce any existing unbalance between the DC voltages $E_X$, $E_S$. There are now more particularly discussed those features of the input system of amplifier 19A which provide for balancing of the unidirectional voltages $E_X$, $E_S$ in minimum time with negligible or no overshooting of the balance point.

The efficiency of the modulator 23A in conversion of any unbalance between the DC voltages $E_X$, $E_S$ to an AC error signal is substantially enhanced by connection of resistor 16A of high magnitude between the summing point 17 and the filter capacitor 15A. In absence of such resistance means, or equivalent inductance of high impedance at the modulation-frequency F, the filter capacitor 15A affords between the summing point 17 and the common connection C an AC path whose impedance is much lower than that of the path including capacitor 20A and the input impedance of amplifier 19A. Thus, for any given unbalance between the unknown voltage $E_X$ and the output voltage $E_S$ of the slidewire 24, the high impedance means 16A insures a substantially higher AC input signal for amplifier 19A. The high resistance 16A also serves further to attenuate any AC picked up by the transducer 13 or its leads. Even in installations where the filter 14A, 15A may be omitted, the high resistance or high impedance means 16A between the summing point 17 and the input terminal 11 insures high conversion efficiency of the modulator 23A.

Furthermore, with the unidirectional voltage $E_X$ connected to the summing point 17 through an impedance 16A, which is of the same order or higher order of magnitude as the input impedance of amplifier 19A, the AC signal appearing across the input resistor 21A, or equivalent, of the amplifier includes in addition to the error signal a damping component proportional to the velocity of the slidewire as being moved by motor 28 towards its new balance point. The damping network includes the resistor 16A connected between the summing point 17 and the first signal input terminal 11; the capacitor 20A providing coupling between the summing point 17 and the first input terminal of the amplifier 39; and a second resistor 21A connected between the first and second input terminals of the amplifier 39. Thus, even if during rebalancing there is still a large error signal but it is being rapidly reduced, the output of the amplifier will be low or reversed in phase for reduction of the motor speed.

By a trimming adjustment of the value of either or both filter resistor 14A and filter capacitor 15A, this damping component may be optimized to attain rebalancing of the slidewire in minimum time with little or no overshoot of the balance point. In brief, the impedance value of resistor 16A should be substantially larger than the input impedance of the amplifier, the time constant of the network comprising the coupling capacitor 20A, and the amplifier input impedance 21A should be approximately equal to, but not substantially higher than, the time constant of the electromechanical rebalancing means comprising the motor 28 and the slidewire 24, and the time constant of the RC network 14A, 15A when used should be substantially greater than the period of the modulation-frequency F.

Suitable values for the input circuit components of the vacuum tube amplifier 19A, including the modulator 23A and the associated damping circuit, are given in Table A below.

TABLE A

| | | |
|---|---|---|
| Resistors: | | |
| **14A** | kilohms | 5.6 |
| **16A** | megohms | 2.7 |
| **21A** | do | 2.2 |
| **32A, 32B** | kilohms | 100 |
| **33** | ohms (max.) | 33 |
| **24** (for $E_R$=82 volts) | do | 1430 |
| **56** (for $E_R$=82 volts) | kilohms (max.) | 10 |
| **56A** (for $E_R$=82 volts) | kilohms | 20 |
| **55** | do | 10 |
| Capacitors: | | |
| **15A** | microfarads | 22 |
| **20A** | microfarad | .05 |
| Diodes: **31A, 31B** | | 1N482A |
| V. Regulator: **54** | | OG3/85A2 |

Except for differences specifically discussed below, the system 10B shown in FIG. 2 is similar to that shown in FIG. 1. The corresponding elements of both systems are identified by the same reference characters to avoid unnecessary repetition of description applicable to both systems. The amplifier 19B of FIG. 2 is a multi-stage solid-state amplifier using transistors with interstage RC coupling networks. The amplifier gain may be set by adjustment of control dial 44 coupled to one of the interstage coupling resistor 43. With the base of the first stage transistor 67 (coupled via capacitor 20B to the summing point 17) having a DC bias derived from the potential-divider formed by resistors 21B, 65 and unbypassed emitter-resistor 48, the input impedance of amplifier 19B is relatively high. In consequence, the operating characteristics of the system 10B of FIG. 2, both as to signal sensitivity and to slidewire velocity damping, are much the same as those of FIG. 1.

Suitable values for the input circuit components of the solid-state amplifier 19B of FIG. 2 are given in Table B below.

TABLE B

| | | |
|---|---|---|
| Resistors: | | |
| **14B** | kilohms | 5.6 |
| **16B** | do | 47 |
| **21B** | do | 220 |
| **65** | megohms | 1.2 |
| **32A, 32B** | kilohm | 1 |
| **33** | ohms (max.) | 33 |
| **24** | do | 1430 |
| **56** | do | 700 |
| **56A** | ohms | 240 |
| Capacitors: | | |
| **15B** | microfarads | 22 |
| **20B** | microfarad | 0.5 |
| Diodes: **31A, 31B** | | 1N482A |
| V. Regulator: **66** | Zener | 1N823 |

Except for differences specifically discussed, the system 10C shown in FIG. 3 is similar to that of FIGS. 1 and 2 and the same reference characters are used to identify corresponding elements. In the transistor amplifier 19C of FIG. 3, the collector of the first stage transistor 67 is directly coupled to the base of the second stage transistor. The base of the first transistor is coupled to the summing point by the capacitor 20C and its DC bias is derived from the feedback network including resistor 21C. With this circuitry, the effective input impedance of the amplifier is relatively low. In consequence, the damping network including resistor 16C and capacitor 20C is relatively ineffective to produce an adequate AC signal component proportional to slidewire velocity. To supplement such damping component in the system 10C of FIG. 3, one or the other of the connections from the modulator 23C to the point 17 or 27 includes a lead network, including resistor 70 and a capacitor 71 in shunt thereto for deriving a rate signal proportional to slidewire velocity.

Suitable values for such rate network and other elements of the input circuit of the solid-state amplifier 19C of FIG. 3 are given in Table C below.

TABLE C

| | | |
|---|---|---|
| Resistors: | | |
| **14C** | kilohms | 5.6 |
| **16C** | do | 3.3 |
| **21C** | do | 47 |
| **32A** | kilohm | 1 |
| **32B** | do | 1 |
| **33** | ohms (max.) | 33 |
| **70** | kilohms | 5.6 |
| **24** | ohms (max.) | 1430 |
| **56A** | ohms | 240 |
| **56** | ohms (max.) | 700 |
| Capacitors: | | |
| **15C** | microfarads | 22 |
| **20C** | do | 2 |
| **71** | do | 22 |
| Diodes: **31A, 31B** | | 1N482A |
| V. Regulator: **66** | Zener | 1N823 |

In any of the systems of FIGS. 1 to 3, the diode-modulator (23A, B or C) may be replaced by the transistor modulator 23D of FIG. 4. Such substitution is particularly of advantage in the system of FIG. 3 in which the modulator resistors 32A, 32B are of suitably high value to swamp out leakage unbalance of diodes 31A, 31B. When the transistor 75 of FIG. 4 is switched "on," the effective resistance of the modulator 23D to the AC signal is negligible and essentially the full signal voltage appears across the input terminals of the amplifier. In modulator 23D, the emitter and collector of transistor 75 are connected to the summing point 17 and the slidewire contact 27. The base-collector circuit of transistor 75 includes the base-current limiting resistor 32 in series with the resistor 76 to which unidirectional pulses of the modulator frequency F are supplied. Specifically, the resistor 76 is connected across the secondary of the supply transformer 36 in series with the half-wave-rectifier diode 79. The capacitor 77 in shunt to resistor 76 is of value appreciably extending the on-time of the modulator cycle. It will be noted that for one polarity of the unbalance between the points 34 and 35 the transistor 75 is operating in the so-called inverted mode; for discussion of the mode of operation, see pages 19–22, Section 16 of Lloyd P. Hunter's "Handbook on Semiconductor Electronics," First Edition, 1956, McGraw-Hill Book Company.

The amplifier 19 may be of any suitable type including those shown in FIGS. 1 to 3. For a solid-state amplifier having a low input impedance, a rate network 70, 71 such as shown in FIG. 3 should be included in either connection 35, 17 or 34, 27 of the modulator. To give a specific example of a suitable transistor-modulator 23D, the transistor 75 may be of the 2N2712 type; resistor 32 may have the value of 33 kilohms; resistor 76 may have a resistance of 1 kilohm, and pulse-stretching capacitor 77 a value of 1.0 microfarad. The diode 79 (which may be of CER69 type) and resistor 76 limit the leakage current during the off-time of the modulator cycle. When the amplifier 19 is a vacuum tube type, the input circuit values given in Table A are satisfactory; similarly, for transistor amplifiers, the circuit values in Tables B and C are satisfactory. In any of FIGS. 1 to 4, the solid-state modulator shown may be replaced by any other suitable type of synchronous switch, such for example as a photoconductive cell and neon light chopper combination, a vibratory reed switch, or a rotating commutator. In FIGS. 1 to 4, the common connection C permits one DC power supply to be used for more than one measuring circuit and/or amplifier.

What is claimed is:

1. A self-balancing system for measuring the unknown voltage of a DC source having output terminals respectively connected to a summing point and a common connection comprising a transistor amplifier of the type having low input impedance and which has input terminals respectively connected to said summing point via coupling capacitance means and to said common connection, means for producing an opposing DC voltage of known variable magnitude comprising a potentiometer network having a terminal connected to said common connection and including a balancing slidewire having a relatively adjustable contact, reversible motor means energized by output-pulses of said amplifier and mechanically coupled to said slidewire, a modulator connected solely between said slidewire contact and said summing point to provide for said amplifier input-pulses of polarity dependent upon the sense of unbalance of said known and unknown DC voltages, continuously conductive constant impedance means providing the connection from said summing point to the corresponding terminal of said DC source of unknown voltage, the impedance of said continuously conductive constant impedance means being at least of the order of magnitude of the input impedance of said amplifier for enhanced conversion efficiency of said modulator, said continuously conductive constant impedance means jointly with said coupling capacitance means and the input impedance of the amplifier providing a damping component of said input-pulses which is proportional to slidewire velocity and is in algebraic addition to the error component corresponding with the difference between said opposed known and unknown voltages, and a lead network in series with the modulator between said summing point and said slidewire contact to provide a supplemental damping component of said input-pulses which is proportional to slidewire velocity and is in algebraic addition to the error component corresponding with the difference between said opposed known and unknown DC voltages.

2. A self-balancing system as in claim 1 additionally including capacitance means connected between said output terminals of said DC source of unknown voltage in a series path including part of said conductive impedance means to provide a filter section which attenuates any AC pickup superposed on the unknown DC voltage, the remainder of said conductive impedance means as connected between said capacitance means and the summing point effectively preventing the relatively low impedance of said capacitance means from significantly lowering the conversion efficiency of said modulator.

3. A self-balancing system for measuring the unknown voltage of a DC source having output terminals respectively connected to a summing point and a common connection comprising an amplifier having input terminals respectively connected to said summing point via coupling capacitance means and to said common connection, means for producing an opposing DC voltage of known variable magnitude comprising a potentiometer network having a terminal connected to said common connection and including a balancing slidewire having a relatively adjustable contact, reversible motor means energized by output-pulses of said amplifier and mechanically coupled to said slidewire, a modulator connected solely between said slidewire contact and said summing point to provide for said amplifier input-pulses of polarity dependent upon the sense of unbalance of said known and unknown DC voltages, said modulator including a transistor whose output terminals are respectively connected to said slidewire contact and said summing point, first and second resistance means connected in series between the base of said transistor and one of its said output terminals, means for supplying unidirectional current pulses to one of said resistance means periodically to turn on the transistor, and capacitance means in parallel to said one of said transistor means to extend the on-time of the modulator cycle, continuously conductive constant impedance means providing the connection from said summing point to the corresponding terminal of said DC source of unknown voltage, the impedance of said continuously conductive constant impedance means being at least of the order of magnitude of the input impedance of said amplifier for enhanced conversion efficiency of said modulator, said continuously conductive constant impedance means jointly with said coupling capacitance means and the input impedance of the amplifier providing a damping component of said input pulses which is proportional to slidewire velocity and is in algebraic addition to the error component corresponding with the difference between said opposed known and unknown voltages.

References Cited

UNITED STATES PATENTS

| | | | |
|---|---|---|---|
| 2,471,835 | 5/1949 | Norgaard | 318—29 X |
| 2,493,669 | 1/1950 | Gray | 321—44 |
| 2,659,848 | 11/1953 | Mouzon | 318—28 |
| 2,873,364 | 2/1959 | Huddleston et al. | 328—85 X |
| 2,938,174 | 5/1960 | Bulleyment | 318—29 X |
| 2,996,670 | 8/1961 | Simonton | 324—99 X |
| 3,056,076 | 9/1962 | Hedgcock | 318—29 |
| 3,242,428 | 3/1966 | Brumley et al. | 324—99 |

FOREIGN PATENTS

| | | |
|---|---|---|
| 890,390 | 2/1962 | Great Britain. |

RUDOLPH V. ROLINEC, *Primary Examiner.*

WALTER L. CARLSON, *Examiner.*

G. L. LETT, E. F. KARLSEN, *Assistant Examiners.*